July 13, 1926.

R. F. HALL 1,592,693

AIRPLANE

Filed April 2, 1923   3 Sheets-Sheet 1

Inventor
Randolph F. Hall,

Witness:
Robert F. Bake

By
Albert Steck
Attorney

July 13, 1926.                                              1,592,693
R. F. HALL
AIRPLANE
Filed April 2, 1923      3 Sheets-Sheet 2
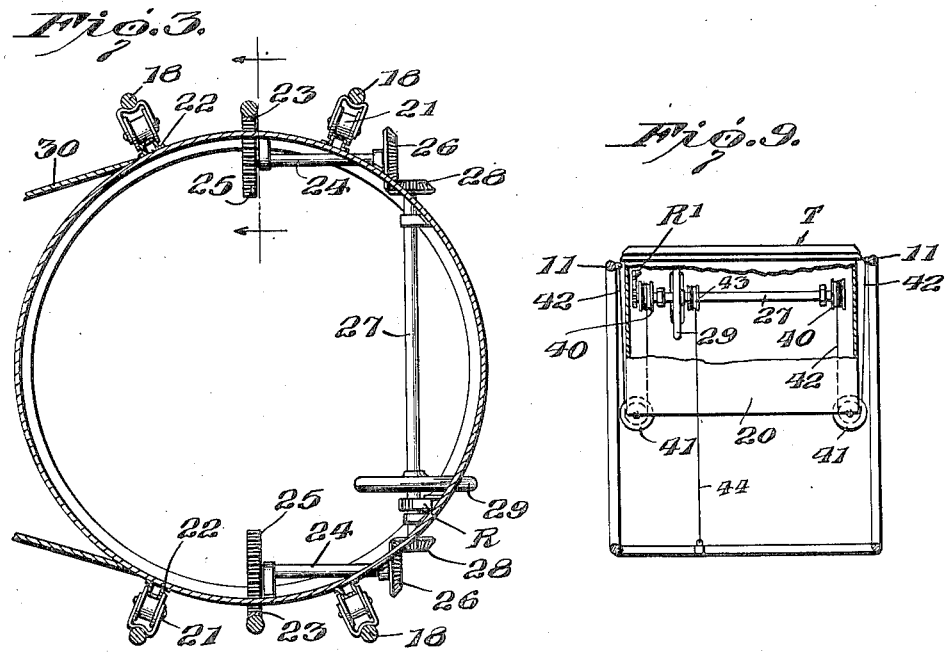
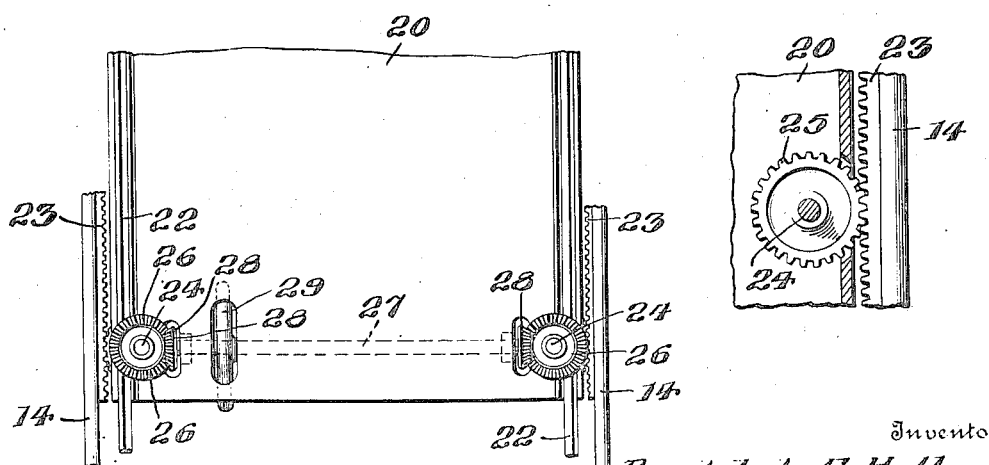
Inventor
Randolph F. Hall,
Witness:
Robert F. Beck
By Allen E. Peck
Attorney

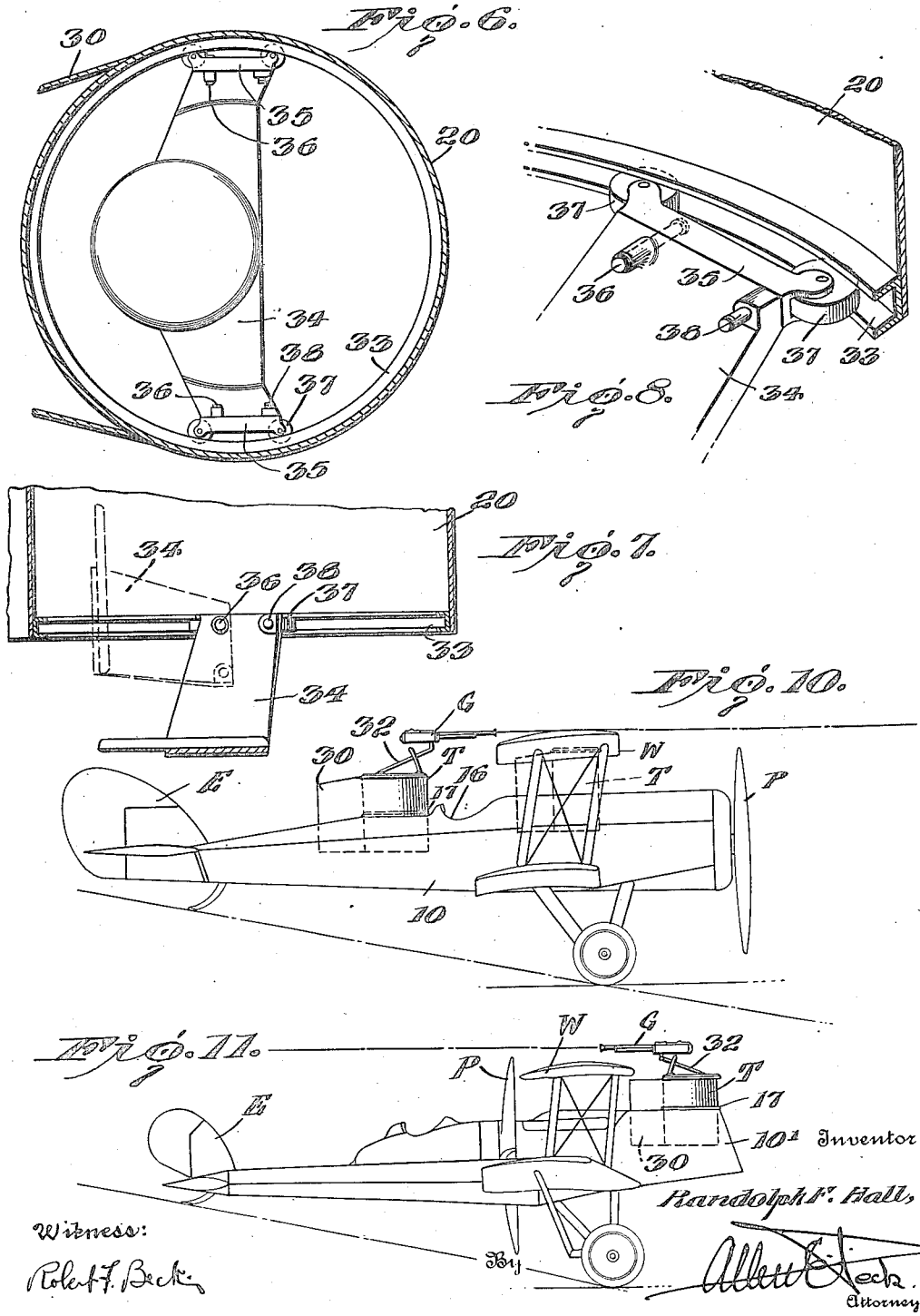

Patented July 13, 1926.

1,592,693

UNITED STATES PATENT OFFICE.

RANDOLPH F. HALL, OF ITHACA, NEW YORK, ASSIGNOR OF ONE-THIRD TO THEODORE P. HALL, OF WALLINGFORD, CONNECTICUT.

AIRPLANE.

Application filed April 2, 1923. Serial No. 629,466.

This invention relates to certain improvements in airplanes and the nature and objects of the invention will be readily recognized and understood by those skilled in the arts involved in the light of the following explanation and detailed description of the accompanying drawings illustrating what I at present consider to be the preferred embodiments or mechanical expressions of the invention from among various other forms, arrangements, combinations and constructions of which the invention is capable within the spirit and scope thereof.

The invention deals with the mounting and operation of aircraft ordnance and armament generally, but is primarily directed to the solution of certain problems and the elimination of certain disadvantages encountered in the mounting and operation of ordnance of the machine gun or other types, on aircraft, and more particularly to the mounting of ordnance on an airplane body or fuselage for operation and use from a gunner's station or cockpit formed on or in the body or fuselage.

With the types and designs of airplanes in general use, the conventional ordnance mounting is characterized by a cockpit formed in the body or fuselage and a movably and adjustably mounted gun or guns of the desired type mounted and accessible for operation from the cockpit by a gunner stationed therein. Guns so mounted are necessarily in proximity or close to the airplane body or fuselage in order to be accessible to and efficiently operated by a gunner stationed in a cockpit, as well as to reduce parasite resistance from guns and mounts therefor to a minimum, and to avoid interference with the proper balance and control of an airplane on which mounted. With guns so mounted on an airplane body and so restricted as to the distance from the body at which they may be positioned, due to the design and structural characteristics of the conventional types of airplanes, the range of fire of such guns and the range of vision of gunners operating the same are materially limited and restricted by intervening elements and structure of the airplane, such for example as wings, control surfaces, and propellers.

One of the basic and fundamental objects of this invention is to overcome the foregoing conditions encountered by airplane body mounted ordnance, and to materially increase the range of fire of such ordnance and the range of vision of gunner's operating the same, without interference with the balance or control, or material lowering of the performance, and with a minimum increase in parasite resistance, of an airplane on which such ordnance is mounted.

Another object of the invention is to provide an adjustable mount for ordnance operable from the gunner's cockpit of an airplane body, which mount forms a shield or guard for the protection of a gunner operating such ordnance.

Another object of the invention is to increase the unobstructed range of fire of airplane body or fuselage mounted guns, by the provision of retractible means for projecting or moving guns so mounted from normal position on an airplane body, outwardly from the body to position in which the range of fire is unobstructed or unrestricted by airplane structure which is within the range of fire with the guns in normal retracted position on a body, and to reduce head resistance to a minimum and eliminate material interference with the balance or control of an airplane when a gun is in projected or extended position from the body.

Another object of the invention is to provide a gun mount for an airplane body, which is mounted in the body and can be projected or extended outwardly from normal position therein to move a gun mounted thereon to a position away from the body so as to increase the range of fire of the gun, and which gun mount forms a protecting car or tower within which a gunner is stationed and from which a gun mounted thereon is accessible for operation by a gunner in all positions of the gun mount.

Another object of the invention is to provide a gun mount for an airplane or similar body, which is mounted in the body for projection outwardly therefrom to move a gun mounted thereon to a position away from the body to increase the unobstructed range of fire, and for retraction to position in the body with a gun in normal operative position, and to so form such a gun mount that it provides a protected compartment in which a gunner is stationed and from which the gun mount can be projected and retracted by a gunner therein.

Another object of the invention is to provide a protected or shielded compartment forming car or tower for mounting a gun, which car or tower is adapted to be mounted in a cockpit of an airplane body or the like, for projection outwardly therefrom to position a gun mounted thereon and carried thereby away from the body, and for retraction from projected position to position housed and confined within the body with a gun mounted thereon in normal operative position on the body.

Another object of the invention is to provide a gun mount for an airplane body or fuselage, which mount is formed by a car or tower providing a gunner's compartment from which a gun mounted thereon is accessible for operation and which is normally housed and confined within the body or fuselage with a gun in operative position thereon, and which car or tower can be projected or extended outwardly from the body by a gunner stationed in the compartment formed by the car or tower to position, a gun carried thereby away from the body or fuselage so as to increase the unobstructed range of fire of the gun and range of vision of the gunner in car or tower.

Another object of the invention is to provide a gun mount for airplanes which is formed by a streamline car or tower providing a gunner's compartment and adapted to be projected and retracted to and from normal position housed within an airplane body or fuselage by a gunner stationed in the car or tower, so that the position of a gun on the mount so formed can be adjusted or varied with respect to the airplane body to increase the range of fire of the gun with a minimum increase in head resistance from the gun mount.

Another object of the invention is to provide an airplane or the like body having a cockpit therein, with a streamline car or tower open to and communicating with the cockpit and normally housed and confined therewithin, which car or tower is adapted to be projected or extended from the cockpit to form an outward continuation thereof and thereby increase the space and capacity of the cockpit.

Another object of the invention is to provide a compartment forming gun-mount adapted to be mounted on an aircraft body for projection and retraction to and from a body on which mounted, with means operable from the compartment formed by the gun mount for projecting and retracting the mount from and to normal position on the body.

With the foregoing and various other objects and results which will be readily recognized and appreciated by those familiar with the aeronautical art, the invention consists in certain novel features in design and mounting, and in arrangements, combinations and construction of elements, as will be more fully and particularly pointed out and specified hereinafter.

Referring to the accompanying drawings:—

Figure 3 is a horizontal section taken through the compartment forming car or tower of the form of Figs. 1 and 2, showing one form of operating mechanism for projecting and retracting the mount.

Fig. 4 is a vertical section through a portion of the mount of Figs. 1 and 2, showing a portion of the operating mechanism therefor.

Fig. 5 is a detail view showing a rack engaging gear and a portion of a rack of the operating mechanism.

Fig. 6 is a top plan view of the mount of Figs. 1 and 2, showing the arrangement and mounting of the adjustable gunner's seat or support in the car or tower.

Fig. 7 is a detail vertical section through the gunner's seat and inner end of the car or tower, the seat being shown in dotted lines in position swung upwardly in the tower.

Fig. 8 is a detail perspective view of the adjustable mounting of the seat in the lower end of the car or tower of the mount.

Fig. 9 is a view in side elevation, more or less diagrammatical, of a gun mount of the invention provided with a modified form of operating mechanism, a portion of the car or tower of the mount being broken away.

Fig. 10 is a view in side elevation, more or less diagrammatical, of a tractor airplane provided with the gun mount of Figs. 1 and 2 mounted thereon and in projected position, and further showing in dotted outline a possible mounting of a car or tower of the invention in the fuselage between the wings of a biplane truss.

Fig. 11 is a view in side elevation, more or less diagrammatical, of a pusher airplane having a gun mount of the invention mounted in the forward or nose end of a nacelle or fuselage thereof.

The forms, embodiments and mechanical expressions of the principles and various features of the invention illustrated in the accompanying drawings and described hereinafter, are shown applied to and mounted on aircraft bodies of the airplane fuselage type. However, it is not intended by the illustrated examples of the invention to limit the application and use thereof to airplanes, for as will be clearly apparent to those skilled in the art, the invention and the principles thereof are equally adapted for application to all types of aircraft, both lighter-than-air and heavier-than-air, as well as capable of other applications and uses where similar conditions and problems are encountered in the mounting and operation of ordnance and the protection of gunners therefor. The examples of the invention illustrated herewith are presented as applied to aircraft bodies of the airplane fuselage type because the problems and conditions overcome by the invention are met within an accentuated degree in the mounting and operation of ordnance on airplanes, and hence these examples serve to more clearly bring out the objects and results of the invention.

Figure 1:
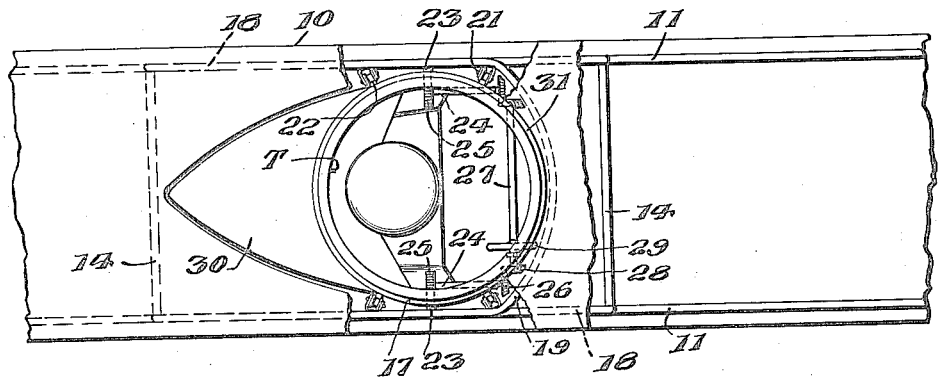
Fig. 1 is a view in top plan, more or less diagrammatical, of a portion of an airplane fuselage with one form of a gun mount embodying the invention mounted thereon.
Figure 2:
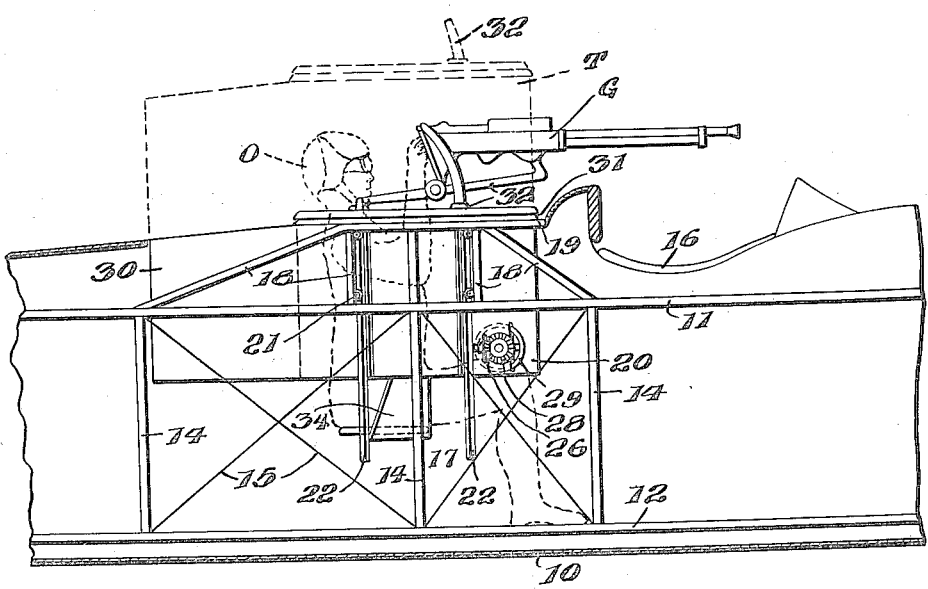
Fig. 2 is a view in side elevation of a portion of an airplane fuselage with the form of the gun mount of Fig. 1 mounted thereon, the projected position of the mount being shown in dotted outline.

In Figs. 1 and 2 of the accompanying drawings, a portion of a conventional type of airplane fuselage 10 is more or less diagrammatically illustrated, with one form and embodiment of the invention mounted thereon and incorporated therein. The fuselage 10 includes the usual or any other suitable frame, which in the present instance is formed of the pairs of upper and lower longérons 11 and 12, respectively, with the compression members 14 and tension wires or rods 15 extending between and suitably connecting and bracing the longérons, as will be familiar to and understood by those skilled in the aeronautical art. A pilot's or control cockpit 16 is formed in the fuselage 10, in the usual or any other desired manner, and in the present instance a gunner's or observer's cockpit 17 of the open type is provided in the fuselage 10 aft of the pilot's cockpit 16. The arrangement of the cockpits 16 and 17 in the fuselage 10 of a tractor biplane is shown in Fig. 10 of the drawings, in which type of airplane the cockpits are located in the fuselage intermediate the wings W and the empennage assembly E.

The provision of cockpits of the open type to form gunner's or observer's stations on airplanes is conventional practice and the usual mounting of ordnance on an airplane fuselage for operation and use from an open cockpit, includes an adjustable mount on which the ordnance is supported so as to be accessible to a gunner in the cockpit. Such adjustable ordnance mounts are generally of the type consisting of a base in the form of a ring rotatably supported on or from the fuselage around and surrounding an open cockpit, on which base the ordnance is adjustably mounted in the desired manner. Due to the design and construction of an airplane and to the limits within which ordnance mounted thereon is operable by a gunner from an open cockpit, it is necessary that ordnance be mounted in position on a fuselage in proximity thereto, with the result that the range of fire of such ordnance is materially limited by intervening structure of an airplane, such as wings, propeller and empennage, as will be clear by reference to Fig. 10 of the drawings in which the wings W, propeller P, and empennage E are within the range of fire of ordnance mounted in the conventional manner on and in proximity or close to the fuselage 10 for operation from a cockpit therein, such as the cockpit 17.

According to the invention, an aircraft ordnance mount is provided capable of projection from an aircraft body to position the ordnance so that the range of fire thereof is not obstructed by structure or elements of the aircraft normally within the range of fire, and which mount forms a shielded or protected compartment for a gunner operating the ordnance and from which the mount can be projected and retracted by the gunner therein. In the illustrated form and mechanical expressions of an ordnance mount embodying the features of the invention as applied to and incorporated in the airplane fuselage 10 of Figs. 1, 2, and 10, a supporting truss or frame is provided in the fuselage 10 around the cockpit 17, and comprises the frame or truss members 18 extending upwardly from the longérons 11 of the fuselage frame with the member 19 connecting the members 18 at and around the open outer end of cockpit 17.

The ordnance mount includes a car or tower T which is mounted in the cockpit 17 of the fuselage 10 for projection and retraction from and to normal position within the cockpit, and provides a protected or shielded compartment open to, in communication with and forming a portion of the cockpit space within which a gunner or observer can be stationed. In the example illustrated, the car or tower T is formed by a substantially cylindrical metal shell or casing 20 mounted and extending a distance into the cockpit 17 and substantially occupying a portion thereof with its ends open and in communication with the cockpit 17, so that the protected compartment provided thereby forms a portion of the cockpit space, as will be clear by reference to Figs. 1 and 2 of the accompanying drawings. The shell or casing 20 forming the tower T is mounted and confined within the cockpit 17 against lateral or rotational movements, but free to be projected outwardly from the fuselage 10 and withdrawn or retracted inwardly from projected position to normal position within the fuselage.

The supporting truss formed of the members 18 extending upwardly from the fuselage frame on opposite sides of the cockpit 17 and connected at their outer ends by the member 19 extending around and defining the outer open end of the cockpit, provides a support for the means for guiding and for confining the tower T against lateral and turning movements, during projection and retraction thereof. Each side of this supporting truss includes a pair of spaced vertically disposed truss members 18 extending upwardly from the longérons 11, respectively, of the fuselage frame on opposite sides of the cockpit 17 (see Fig. 2). Flanged anti-friction rollers 21 are mounted on and extend from the inner sides of each vertically disposed truss member 18 respectively, and spaced apart thereon in vertical alinement, so that there are parallel spaced series of vertically alined flanged rollers 21 on each side of cockpit 17 and a tower T mounted in position within the cockpit. The tower T is provided on the opposite outer sides thereof with the pairs of spaced vertically disposed guide rails or bars 22, respectively, which are suitably rigidly attached or secured thereon and extending a distance from and beyond the inner or lower end of the car or tower T. The pairs of guide rails 22 are so spaced and positioned on the opposite sides of the tower T as to fit into and bear against the spaced series of vertically alined rollers 21, respectively, and thus confine the tower T against lateral and turning movements, while permitting free longitudinal movements thereof over and on the rollers 22 from and to normal position within the cockpit 17 of fuselage 10.

The invention provides mechanism for operating, that is for projecting and retracting, the tower T formed by the casing 20 mounted in the fuselage 10, as above described, and one form and embodiment of such mechanism is illustrated in Figs. 1 to 5 of the accompanying drawings. Rack bars 23 are mounted in vertically disposed position on opposite sides of the fuselage frame and supporting frame or truss thereon, and in the present example are fixed to opposite members 14, respectively, of the fuselage frame and extend upwardly therefrom on opposite sides of the tower T intermediate the opposite pairs of roller supporting truss members 18 respectively. The opposite rack bars 23 extend upwardly from the fuselage frame to and terminate at the member 19 of the supporting truss around the outer open end of cockpit 17. By the foregoing arrangement, the rack bars 23 are mounted in vertical position on diametrically opposite sides of and spaced from the tower T. Horizontally disposed shafts are mounted at the lower or inner end portion of tower T on opposite sides thereof in suitable bearings thereon and extend at substantially right angles to the rack bars 23, through the wall of casing 20 from the exterior thereof to and terminating within the tower opposite the rack bars 23, respectively. The inner end of each shaft 24 within the tower T is provided with a pinion 25 fixed thereon and extending through a suitable aperture formed in the lower or inner end of the wall of casing 20, to and in mesh with the rack bar 23 respectively opposite and adjacent thereto (see Figs. 3 and 5). The outer ends of the shafts 24 on the exterior of the casing 20 of the tower T are provided with the bevel gears 26, respectively, suitably keyed or otherwise fixed thereon to rotate therewith. The bevel gears 26 are mounted on the shafts 24 in proximity to the wall of casing 20 and a portion thereof extends through suitable openings formed in the adjacent wall of casing 20, respectively.

An operating shaft 27 for rotating shafts 24 and pinions 25 in mesh with the fixed rack bars 23, respectively, is mounted in substantially the same horizontal plane at the lower or inner end of the tower T, extending transversely through and across the casing 20 at right angles to the opposite parallel shafts 24, and with its ends terminating adjacent to and spaced from the outer ends of the shafts 24, respectively, on which the bevel gears 26 are mounted. The ends of operating shaft 27 are provided with the bevel gears 28, respectively, which gears extend through suitable openings formed in the wall of casing 20, and mesh with the bevel gears 26, respectively, at points within the tower T (see Fig. 3). By the mounting and arrangement of shafts 24 and shaft 27 on and extending through and meshing on the interior of the casing it is possible to secure a compact assembly of the operating mechanism with those elements or portions thereof on the exterior of the casing extending a minimum distance outwardly therefrom, so as to avoid interference with the fuselage frame and support truss thereon around the cockpit in which the tower is mounted. An operating hand wheel or equivalent element 29 is mounted on and fixed to the shaft 27 within the tower adjacent one end of the shaft, by means of which the operating mechanism for projecting and retracting the tower can be manually operated.

With the tower T in normal retracted position within and enclosed by the cockpit 17 of the fuselage 10, as clearly shown in Fig. 2 of the drawings, and the opposite pinions 25 extending through opposite sides of the tower and in mesh with the rack bars 23, respectively, fixed in vertical position on opposite sides of the fuselage frame, by rotating the pinions 25 in the proper direction, through rotaton of shaft 27, meshed gears 26 and 28, and shafts 24, the tower T can be raised or projected outwardly from the fuselage, and can be lowered or retracted from projected position to normal position within the fuselage. The extent of projection of the tower T is determined by the length or depth thereof and the position of the operating mechanism therein. Preferably, means are provided for locking the tower in the desired position, and in the present instance a suitable ratchet and pawl mechanism R is diagrammatically illustrated as cooperating with the operating shaft 27 within the tower, so that the shaft 27 can be locked thereby against rotation and thus maintain the tower operating mechanism inoperative and the tower T in the desired position. Various other means may be employed for locking the tower T in adjusted position, such for example as by the use of self-locking gearing in the tower operating mechanism, and therefore it is not desired to limit the invention to the use of ratchet and pawl mechanism for performing these functions.

When the tower T is in position projected from the cockpit 17 of the fuselage 10, the compartment provided therein by the casing 20, forms an outward continuation of the cockpit space, with the result that the normal cockpit space is increased. This feature of the invention can be taken advantage of and is of considerable utility for transporting cargo or other useful load where the normal cockpit capacity is insufficient for the useful load it is desired to carry or transport therein.

In order to reduce as much as possible an increase in head or parasite resistance by the tower T in projected positions extending outwardly from the fuselage, the invention provides for suitably streamlining the casing 20 forming the tower T. The streamlining of the form of tower illustrated is carried out by providing a shell 30 of substantially the same depth as the casing 20 and secured thereon extending rearwardly therefrom with the opposite sides of the shell 30 converging rearwardly from the opposite outer sides of the casing 20, and closed by a wall or the like at the upper or outer end thereof (see Figs. 1 and 2). A suitable opening is formed through the upper skin of the fuselage to permit free passage of the streamline shell fixed on casing 20, from and to normal retracted position within the fuselage 10. Attention is directed to the fact that the illustrated manner of streamlining the casing 20 by securing the shell 30 thereto is merely shown by way of example for purposes of explanation, and it is not intended to limit this feature of the invention to such construction and arrangement. If desired, where the tower T is formed by a casing or the like such as 20, the casing can be formed of the desired shape to secure the proper streamlining thereof, or various other expedients may be resorted to to secure the desired results for this feature of the invention, to wit, the highest reduction of head or parasite resistance offered by the tower of the mount in projected or extended positions.

The tower T formed, arranged and mounted in the manner above referred to and explained, provides the support on which the desired ordnance is adjustably mounted and carried for projection and retraction from and to normal position with respect to the fuselage 10 in which the tower T is mounted. In Fig. 2 of the accompanying drawings one manner of mounting ordnance on the tower T is shown. The upper or outer end of the casing 20 forming the tower T is provided with a Scarff ring 31 mounted thereon and extending therearound, and an adjustable gun mount 32, of a well-known and universally used type which will require no further or detailed description to be understood by those skilled in this art, is mounted on the upper or outer end of the tower T for rotation thereon and therearound. Any desired or suitable ordnance, such as the machine gun G is secured on and carried by the adjustable mount 32 in such a position with respect to the compartment formed by the tower T and the cockpit 17 in the fuselage 10, as to be readily accessible to and operable therefrom by a gunner or observer stationed therein, as will be clear by reference to the accompanying drawings. Various other types of mounts may be utilized for adjustably mounting ordnance on the tower T to secure the results from the feature of the invention which provides for the projection and retraction of ordnance by the tower T from and to normal position on a fuselage or other aircraft body, and therefore it is not intended to limit the invention to the particular type shown.

The tower T is provided with a suitable gunner's or occupant's support, which in the example illustrated takes the form of a seat depending from the lower or inner end of the casing 20, and mounted for rotation therearound; and for swinging movement to folded position in proximity to one side of the casing 20 of the tower. In Figs. 6, 7, and 8, of the drawings, the above form of occupant support is illustrated in detail. A channel member 33 is secured in fixed position around the lower or inner end of casing 20 of tower T, on the interior thereof and forming a groove or track therearound. A substantially U-shaped support 34 forming a seat is mounted in position extending across and depending inwardly or downwardly a distance from the casing 20, with its opposite side members pivotally mounted at their outer or upper ends to the opposite carriages 35 by means of the pivot pins or the like 36. The carriages 35 include the wheels or rollers 37 fitting and confined in the groove or track formed by the channel member 33, so that with the support 34 mounted extending between and secured at its opposite ends to the opposite carriages 35, the support is freely rotatable around the lower or inner end of the casing 20 on the carriages 35 to the desired position. The pivot pins 36 in and securing the opposite side members of the support 34 to the carriages 35 are axially alined and mounted through the support 34 off center thereon, so that the support can be swung upwardly toward the adjacent side of the casing 20 to a position as indicated by the dotted lines in Fig. 7. Any suitable or desired locking means, such as the spring catches 38, are mounted in the opposite side members of the support 34 and are adapted to engage the carriages 35, respectively, to maintain the support 34 in normal position extending across the casing. By releasing the catches 38, the seat forming support 34 can be quickly swung to position shown in Fig. 7, in which the compartment formed by the casing 20 and the cockpit in which the casing is mounted are not materially obstructed thereby. Obviously, the pivot pins 36 are made removable to permit of detaching the seat forming support 34 from mounted position on the carriages 35 and the casing 20 of the ordnance mount.

A modified form of operating mechanism for projecting the tower T is purely diagrammatically illustrated in Fig. 9 of the drawings. In this form of mechanism the operating shaft 27 with the hand wheel 29 thereon is mounted in and across the upper end portion of casing 20 of tower T, and is provided at opposite ends thereof with the winding drums 40. Pulleys 41 are mounted in the lower or inner end of the casing 20 at opposite sides thereof adjacent the opposite sides, respectively, of the fuselage frame, and cables 42 are secured and fixed at opposite points on the fuselage frame to the upper pair of longérons 11. The cables 42 extend downwardly or inwardly to and around the pulleys 42, and then upwardly or outwardly to the winding drums 40, respectively, on the shaft 27, to which drums the cables 42 are attached.

A drum 43 is mounted on and fixed to the shaft 27, and a cable 44 is fixed to the lower portion of the fuselage frame, which cable extends upwardly to and is wound around the drum 43 in the opposite direction to cables 42 on drums 40. The drum 43 and cable 44, so arranged, provide for positive steady operation of the tower T.

Thus, by rotating the shaft 27, through hand wheel 29, in the proper directions the cables 42 can be wound and unwound on the drums 40 to project and retract the tower T from and to normal position within the fuselage in which the tower is mounted. In order to permit of locking the tower T in the desired positions, a suitable ratchet and pawl mechanism R' is provided on the shaft 27.

With the tower T in normal retracted position extending into and enclosed within the cockpit 17 of the fuselage 10, the upper or outer end of the casing 20 of the tower is located at and forms the outer open end of the cockpit 17 with the gun mount 32 and gun G carried thereby in position on the fuselage for operation therefrom by a gunner stationed in the tower and cockpit. The normal retracted position of the gun mount 32 and gun G on the tower T is in substantial accord with the conventional position of such ordnance on an aircraft body for operation from an open cockpit therein, as referred to and explained hereinbefore. The tower T in retracted position is substantially enclosed within the fuselage with the tower compartment forming a portion of the cockpit space, so that in retracted position the tower does not offer any increase in head or parasite resistance over the conventional mounting of ordnance on an aircraft body. Where the ordnance mount of the invention includes an armored tower, such as the tower T illustrated, a portion of the cockpit space is protected or shielded thereby with the tower in retracted position, the extent of such protected cockpit space depending upon the length of the tower as will be apparent.

In the operation and use of the form of ordnance mount illustrated and described herewith as mounted in the fuselage of an airplane, a gunner or observer O (see Fig. 2) is stationed in the compartment formed by the tower in the cockpit 17, from which position the ordnance, as the machine gun G, mounted on and carried by the tower is accessible for operation. If desired the gunner O can utilize the seat 34 mounted at the inner end of the tower within the cockpit 17, as shown in dotted outline in Fig. 2 of the accompanying drawings in which the tower T and ordnance carried thereby are shown in full lines in normal retracted position. Now, in the event of attack or for any other cause, the gunner O desires to increase his range of vision and the range of fire of the gun G, by actuating the hand wheel 29 in the proper manner, the tower T and gun G can be projected outwardly from the fuselage until the gun G is in a position unobstructed by elements or structure of the airplane. The projected position of the tower with the gun G in position to fire clear of the wings W, propeller P and empennage E is clearly shown in Fig. 10 of the drawings. In projected position, due to the streamlining 30, head or parasite resistance is reduced to a minimum, and the tower provides a compartment in continuation of the cockpit 17, within which the gunner O is stationed and protected against enemy fire, as well as against the effects of air pressure on the gunner in the operation of the ordnance carried by the tower. After the conditions requiring or calling for projected position of the tower and ordnance thereon have passed, the gunner O by operation of the hand wheel 29 can return or retract the tower to normal position enclosed within the fuselage 10.

In Fig. 10 a possible mounting of a tower T in the fuselage 10 below the upper wing of a biplane truss, is shown in dotted outline. With such position of the tower suitable ordnance (not shown) can be mounted on the wing for operation from the tower T under certain conditions. Fig. 11 discloses an ordnance mount of the invention, including tower T and the gun G carried thereby, mounted for projection and retraction from and to the cockpit 17 in the nose or forward portion of the fuselage or nacelle 10' of an airplane of the pusher biplane type, the mount being shown in projected position with the wings W, propeller P, and empennage E not obstructing the range of fire of the gun G.

The tower T is preferably armored, as by forming the casing 20 of the illustrated example thereof of armored material, or by providing suitable armor for a tower, or tower frame. Attention is here called to the fact that the use of the term "tower" herein and in the appended claims, is not intended by way of limitation but for purposes of explanation and brevity to include any structure, arrangement and assembly of elements forming an occupant or useful load space or compartment adapted to be mounted for projection and retraction from and into an aircraft element, such as an aircraft body, and which is further adapted to provide a mount for ordnance. Those skilled in this art will recognize the fact that the invention is not limited to application on and to aircraft bodies but is equally adapted to mounting on other elements of an airplane, such for example, wings or supporting surfaces of the thick internally trussed type.

It is also evident that various changes, variations, modifications and substitutions might be resorted to without departing from the spirit and scope of the invention, and hence I do not wish to limit the invention to the exact and specific disclosures hereof.

Desiring to protect my invention in the broadest manner legally possible, what I claim is:—

1. In aircraft, an ordnance mount formed by a tower providing a gunner's compartment mounted in an aircraft element and in normal position substantially enclosed by the element, the said tower mounted for projection outwardly from and retraction to normal position in the element, and occupant supporting means mounted in said tower, the said supporting means foldable to position at one side of the tower.

2. In aircraft, an ordnance mount formed by a tower providing a compartment mounted in an aircraft element and in normal position therein substantially enclosed by the element, the said tower mounted for projection to position extending outwardly from and for retraction to normal position within the element, means operable from the compartment formed by said tower for projecting and retracting the same, and occupant supporting means mounted in the tower and movable to position unobstructing the compartment formed by the tower.

3. In an aircraft body having an open cockpit therein, in combination a streamline tower providing a protected compartment mounted in normal position in said cockpit in open communication therewith and substantially enclosed by said body, said tower mounted for projection from said cockpit to position extending outwardly therefrom with the compartment formed thereby providing an outward continuation of the cockpit to increase the capacity thereof, and occupant supporting means mounted in the protected compartment formed by said tower, the said supporting means movable to position in the tower unobstructing said compartment.

4. In combination with an aircraft body, an ordnance mount therefor including a protected compartment forming tower in normal position extending into and substantially enclosed by the body, said tower mounted for longitudinal movement from and to normal position in the body, the outer end of said tower adapted to carry ordnance mounted thereon for operation from the tower compartment, and means for projecting said tower outwardly from the body to position the outer ordnance carrying end thereof a distance from the body and for retracting said tower to normal position in the tower, the said projecting and retracting means operable from the compartment formed by the tower, and an occupant support mounted at the inner end of said tower and movable from operative position therein to a position unobstructing the compartment formed by said tower.

5. An ordnance mount for aircraft, comprising a protected gunner's compartment forming tower adapted to be mounted extending into an aircraft element and freely longitudinally movable for projection outwardly from the element and for retraction from projected positions to normal position thereon, the outer end of said tower formed to carry ordnance thereon for operation from said tower compartment, means on said tower and operable from said gunner's compartment for projecting and retracting said tower, and an adjustable occupant support mounted at the inner end of said tower, said support foldable to inoperative position unobstructing the tower compartment.

6. In combination with an airplane of the pusher type including a supporting surface, a body extended forwardly of and below the supporting surface, and a pusher propeller mounted along the longitudinal center of the body aft of the supporting surface; a retractible ordnance mount comprising a protected compartment forming streamline tower mounted on the forwardly extended portion of the body and normally substantially enclosed therewithin, and the said mount capable of projection outwardly from the body to position ordnance carried thereby outwardly beyond the elements of the airplane aft of said mount.

7. An ordnance mount for aircraft, comprising a gunner's compartment forming tower, ordnance mounted at one end thereof operable by a gunner within the compartment, and an adjustable gunner's support carried at the opposite end and supported from said tower.

8. An ordnance mount for aircraft, comprising a gunner's compartment forming tower, and a gunner's support pivotally mounted thereon for rotation independently of the tower and for swinging movement to position unobstructing said tower compartment.

9. An ordnance mount for aircraft, comprising a gunner's compartment forming tower, and a gunner's support pivotally mounted extending across said tower, said support movable to position at a side of said tower unobstructing said tower compartment.

10. An ordnance mount for aircraft, comprising a gunner's compartment forming tower open at the inner end thereof, and a gunner's support mounted at the open end of said tower, extending thereacross and rotatable thereon around the axis of said tower, the said support swingable to position within the tower unobstructing the compartment formed thereby.

11. An ordnance mount for aircraft, comprising a gunner's compartment forming tower open at the inner end thereof, a trackway around the interior of said tower at the inner end thereof, a gunner's support extending across the inner end of the tower, carriages at the opposite ends of said support movably mounted in said trackway, and said support movable on said carriages around the axis of said tower.

12. An ordnance mount for aircraft, comprising a gunner's compartment forming tower open at the inner end thereof, a gunner's support pivotally mounted extending across and depending below the open inner end of said tower, and said support movable inwardly to position at one side of and unobstructing said compartment.

13. In combination with an aircraft element, an ordnance mount comprising a substantially cylindrical compartment forming tower mounted in said element for projection therefrom and retraction to normal position substantially enclosed therewithin, the said tower movably mounted and supported on the element at spaced points on opposite outer sides thereof, respectively, and a streamline shell carried by said tower in position removed and free from forces applied to the tower at said points of support.

14. In combination, an airship, a gun carriage carried thereby, a gunner's seat, and means detachably suspending said seat from said carriage in such a manner as to permit said seat being readily pushed aside.

15. In combination, an airship, a gun carriage carried thereby, a gunner's seat, and means detachably suspending said seat from said carriage.

16. In combination, an ordnace mount for aircraft, and a gunner's support suspended from said mount and movable transversely with respect thereto.

17. In combination, an ordnance mount for aircraft, a gunner's support, and means for suspending said support from the ordnance mount to permit of swinging the support to inoperative position, unobstructing said mount.

18. In combination, an ordnance mount for aircraft, a gunner's support, means extending across said mount for suspending the gunner's support therefrom, the said means swingable to move said support to position at a side of said mount.

19. In combination, an ordnance mount of the centrally open type, a gunner's support suspended from said mount in operative position below the mount opening, the said support swingable toward a side of said mount to position unobstructing the mount opening.

20. In combination with an ordnance mount, a gunner's support suspended therefrom and attached thereto at a plurality of points, and said support detachable from said mount at certain of the points of attachment to permit of swinging the support toward a side of the mount.

21. In combination with an aircraft body, a compartment forming tower mounted in the aircraft body for projection outwardly a distance therefrom and for retraction to position substantially enclosed within the body, and members depending from the inner end of said tower forming supports therefor in projected position.

22. An ordnance mount for aircraft, comprising a substantially cylindrical armored tower forming a protected gunner's compartment, and a non-armored relatively light weight material shell fixed to and forming a streamline continuation of said tower.

23. In combination with an aircraft body, an ordnance mount embodying a tower mounted in the body for projection outwardly therefrom and retraction to position substantially enclosed therewithin; and means for projecting and retracting said tower, comprising an operating shaft mounted on and disposed across the tower adjacent the outer end thereof, a winding drum on said shaft within the tower adjacent each end thereof, pulleys mounted on opposite sides of the tower at the inner end thereof, cables extending inwardly from said winding drums around said pulleys, respectively, and outwardly and fixed to opposite sides of the aircraft body, respectively, and manually operable means within the tower for rotating said shaft and winding drums.

Signed at Ithaca, New York, this 21st day of March, 1923.

RANDOLPH F. HALL.